(12) United States Patent
Iida et al.

(10) Patent No.: US 6,641,887 B2
(45) Date of Patent: Nov. 4, 2003

(54) OPTICAL RECORDING MEDIUM (75) Inventors: Tetsuya Iida, Tsurugashima (JP); Takamasa Yoshikawa, Tsurugashima (JP); Katsuhiro Koike, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 78 days.

(21) Appl. No.: 09/984,275

(22) Filed: Oct. 29, 2001

(65) Prior Publication Data

US 2002/0051859 A1 May 2, 2002

(30) Foreign Application Priority Data

Oct. 27, 2000 (JP) ........................................ 2000-329256

(51) Int. Cl.$^7$ ................................................. B32B 3/02
(52) U.S. Cl. ...................... 428/64.1; 428/64.4; 428/698; 428/702
(58) Field of Search .................. 428/64.1, 64.4, 428/698, 702, 913; 430/270.11, 495.1, 945

(56) References Cited

U.S. PATENT DOCUMENTS 6,117,512 A * 9/2000 Matsumoto ................. 428/64.1
6,440,516 B1 * 8/2002 Yamasaki ................... 428/64.1
6,468,617 B1 * 10/2002 Yamazaki ................... 428/64.1

* cited by examiner

Primary Examiner—Elizabeth Mulvaney
(74) Attorney, Agent, or Firm—Sughrue Mion, PLLC (57) ABSTRACT

Provided is an optical recording medium whose surface is not easily injured, particularly an optical recording medium which is not required to be put into a cartridge. The optical recording medium comprises a recording layer, a covering layer comprising a polymer material, and a protective layer which are successively deposited, recording or reproducing wavelength for the medium being 420 nm or less, the numerical aperture of an optical system for the medium being 0.74 or more, and light being radiated to the side of the protective layer to read out data in the recording layer. In the medium, the protective layer has a hardness of 1000 kg/mm$^2$ or more and a thickness of 4.66 μm or less.

14 Claims, 5 Drawing Sheets

RELATIONSHIP BETWEEN DISC THICKNESS ERROR OF DVD
(WAVELENGTH:650nm, NA:0.6 AND SUBSTRATE REFRACTIVE
INDEX:1.58) AND ABERRATION THEREOF

FIG. 5

RELATIONSHIP BETWEEN DISC THICKNESS ERROR OF DISC
ADAPTED FOR HIGH-VISION(WAVELENGTH:405nm, NA:0.85 AND
SUBSTRATE REFRACTIVE INDEX:1.58) AND ABERRATION THEREOF

FIG. 8

OPTICAL RECORDING MEDIUM

BACKGROUND OF THE INVENTION

1. Field of the Invention

The present invention relates to an optical recording medium wherein light is used to read out recorded data, particularly to an optical recording medium whose surface is not easily injured.

2. Related Art

Conventionally, a resin such as polycarbonate or PMMA is naked to the surface of an optical disc. Thus, it is f eared that the surface is injured when the optical disc is handled. When dirt adhering to the surface of the optical disc is wiped out, the surface of the optical disc is rubbed by the adhering dirt so that the surface may also be injured. In the case that signals are read out through a pickup or signals are recorded on the optical disc, such an injury causes deterioration of the readout signals or recorded signals. Therefore, about recording-type optical discs which are affected by injuries upon both of recording and reproducing, such as DVD-RAM, MD and MO, it is essential that the optical discs are put into cartridges when used.

On the other hand, about ROM type optical discs for reproducing use only, no cartridge has been required up to now since fine injuries in the surface thereof do not produce fatal effects on reproducing.

In recent years, digital high-vision televising has been prepared to be carried out through BS digital broadcasting. For this, a disc in which digital high-vision signals can be recorded for two hours is demanded. The transmitting rate of digital high-vision is from 19 to 23 Mbps. In order to record signals thereof for two hours or more, a recording capacitance of 17.1 Gbytes or more is required for 19 Mbps×60 seconds×120 minutes or more conditions in the case that the transmitting rate is 19 Mbps. A recording capacitance of 20.7 Gbytes or more is required for 23 Mbps×60 seconds 120 minutes or more conditions in the case that the transmitting rate is 23 Mbps. This is 3.64–4.4 times larger than the recording capacitance of digital versatile discs (DVDs), that is, 4.7 Gbytes. In order to realize reproducing which is not less than 3.64 times denser than reproducing of DVDs, it is necessary to raise the resolution for reproducing, that is, make the spot diameter of the reproducing beam used smaller. The spot diameter $\phi$ of the reproducing beam is represented by the following: $\phi = k\ \lambda/NA$ wherein the wavelength of the reproducing light source used is $\lambda$, the numerical aperture of the objective lens used is NA, and k is a constant. For example, by changing the wavelength of the reproducing light source from 650 to 405 nm, the reproducing resolution is improved by 1.6 times. By changing the numerical aperture of the objective lens from 0.6 to 0.85, the reproducing resolution is improved by 1.42 times. Consequently, it becomes possible to reproduce a high-capacity disc whose recording capacitance becomes larger by about 5.16 times $[(1.6)^2 \times (1.42)^2]$.

In order to satisfy a recording capacitance that is not less than 3.64 times larger than that of DVDs, it is necessary that the wavelength of the reproducing light source is 420 nm or less and the numerical number of the objective lens is 0.74 or more.

In the above-mentioned disc, the substrate thereof must be made far thinner than that of DVDs since the disc is highly affected of aberration at the same tilt angle because of the rise in NA. In this case, however, injuries in the surface of the disc or dirt thereon is nearer to the signal surface thereof than in the prior art; therefore, the injuries or the dirt produces a larger effect on recording and reproducing property. Therefore, in the case that a conventional optical disc structure is used, it can be expected that a situation that the optical disc must be put into a cartridge when used is caused.

Concerning a ROM type optical disc, however, it is necessary to consider that the disc is attached to a publication (for example, book) and is used as a part of the publication. Thus, when such a use situation is supposed, an increase in the volume of the optical disc on the basis of the storage thereof into a cartridge or a rise in costs for producing the disc is a fatal drawback. It is therefore demanded that an optical disc wherein data can be very densely recorded can be used without being put into any cartridge. Concerning a recording-type optical disc, for example, an advantage that the use situation thereof can be expanded can be produced by removing the necessity that the disc is put into a cartridge.

SUMMARY OF THE INVENTION

An object of the present invention is to provide an optical recording medium whose surface is not easily injured, particularly an optical recording medium which is not required to be put into a cartridge.

The optical recording medium of the present invention comprises a recording layer, a covering layer comprising a polymer material, and a protective layer which are successively deposited, recording or reproducing wavelength for the medium being 420 nm or less, the numerical aperture of an optical system for the medium being 0.74 or more, and light being radiated to the side of the protective layer to read out data in the recording layer, wherein the protective layer has a hardness of 1000 kg/mm$^2$ or more and a thickness of 4.66 μm or less.

This optical recording medium has the protective layer having a hardness of 1000 kg/mm$^2$ or more. Therefore, the recording medium is suitable for high-density recording, and its surface is not easily injured. The optical recording medium has a recording density of not less than 3.64 times larger than that of DVDs, and is practical.

The thickness of the covering layer may have a thickness of 131 μm or less. In this case, a recording density which is 3.64 times larger than that of DVDs can be attained.

The protective layer may have a light transmissivity of 90% or more to the recording or reproducing wavelength. In this case, restrictions about optical properties which the protective layer supplies to other layers can be made sufficiently small.

The protective layer may comprise an inorganic substance.

The protective layer may comprise diamond-like carbon. In this case, sufficient hardness and flexibility can be given to the protective layer.

The protective layer may comprise a metal oxide. In this case, the protective layer may comprise SiO$_2$ or TiO$_2$.

The protective layer may comprise a metal nitride.

The optical recording medium may be a read-only recording medium.

The optical recording medium producing method of the present invention is a method for producing an optical medium comprising a recording layer, a covering layer comprising a polymer material, and a protective layer comprising diamond-like carbon which are successively deposited, data in the recording layer being read out from the side of the protective layer, comprising the process of forming the covering layer on a surface of the recording layer, and the process of forming the protective layer on the surface of the formed covering layer by vapor deposition.

According to the present method for producing the optical recording medium, the protective layer comprising diamond-like carbon is formed; therefore, the produced recording medium is suitable for high-density recording and its surface is not easily injured. Moreover, sufficient flexibility can be given to the protective layer.

Sputtering may be used in the process of forming the protective layer.

Carbon may be used as a target and a gas comprising argon may be used as a sputtering gas in the process of forming the protective layer.

A gas obtained by mixing argon with at least one selected from hydrogen gas, methane gas and nitrogen gas may be used as the sputtering gas.

PREFERRED EMBODIMENTS OF THE INVENTION

Referring to FIGS. 1 to 8, one embodiment of the optical recording medium of the present invention will be described.

Figure 1:
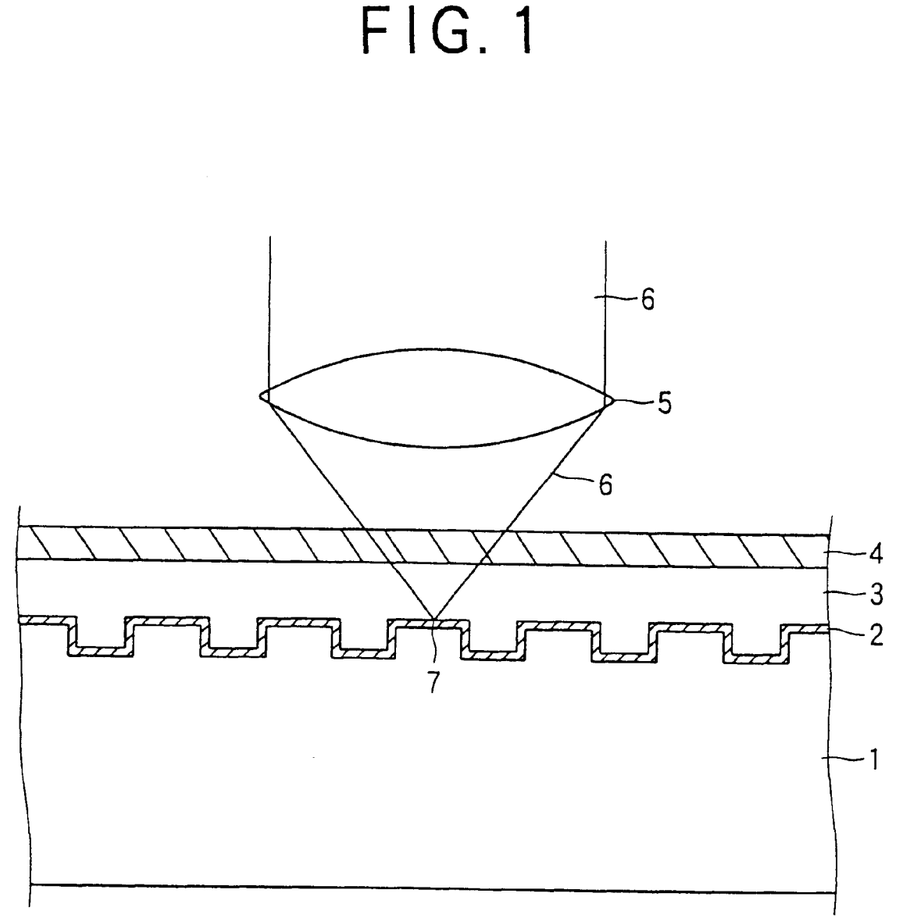
FIG. 1 is a sectional view of an optical recording medium of the present embodiment.

FIG. 1 is a sectional view of an optical recording medium 100 of the present embodiment. As illustrated in FIG. 1, the optical recording medium 100 has a base layer 1, a recording layer 2 formed on the base layer 1, a covering layer 3 made of a polymer material and formed on the recording layer 2, and a protective layer 4 made of diamond-like carbon (DLC) and formed on the covering layer 3. Data recorded on the recording medium 100 are carried as phase pits by means of unevenness of the recording layer 2. The phase pits are spirally formed in the recording surface of the recording medium.

As the material of the base layer 1, polycarbonate or the like may be used. The thickness of the base layer 1 is within the range of 1.0 to 1.2 mm.

As the material of the recording layer 2, acrylic resin or the like may be used. It is desired that the recording layer is formed to have such a thickness that gives 50% or more as a reflectivity against a laser ray having a wavelength of 405 nm.

As the material of the covering layer 3, a dielectric or the like may be used. By using a photocuring resin, such as an ultraviolet ray curing resin, the covering layer 3 having a relatively thin thickness can easily be formed. Thus, such use is profitable for the production of the present recording medium. The photocuring resin for use may be a liquid resin, or may be a resin that has not been cured but has been fashioned into the form of a film having a given thickness.

It is necessary that the thickness of the covering layer 4 is set to 131 $\mu$m or less. The reason for this will be described in the following.

Concerning conventional DVDs, the thickness of their substrate, which corresponds to the covering layer 4, is 0.6 mm (600 $\mu$m). The thickness of the covering layer 4 will be described while being compared with that of DVDs.

Comatic aberration (W31) is represented by the following:

$$W_{31}=t\times NA^3 \times è \times (n^3-1)/2n^3 \times \lambda \quad (1)$$

wherein t is the thickness of the substrate or the covering layer, NA is the numerical aperture of the objective lens used, è is the tilt angle of the disc, $\lambda$ is the wavelength of the light source used, and n is the refractive index of the substrate or the covering layer to the reproducing wavelength used.

As described above, the numerical aperture (NA) of DVDs is 0.6 while the numerical aperture (NA) of the optical recording medium 100 is 0.85. Therefore, the numerical aperture (NA) of the optical recording medium 100 is about 1.42 times larger than that of the DVDs. The reproducing wavelength of the DVDs is 650 nm while that of the optical recording medium 100 is 405 nm. Therefore, the reproducing wavelength of the optical recording medium 100 is about 1/1.6 time shorter than that of the DVDs. The refractive index of the substrate to the wavelength of 650 nm is substantially equal to that of the covering layer to the wavelength of 405 nm.

From the above numerical value ratios and the equation (1), an effect of the same tilt angle on comatic aberration in the optical recording medium 100 is about 4.563 times larger than that in the DVDS. As described above, the substrate of the DVDs has a thickness of 600 $\mu$m; therefore, the effect of the same tilt angle is larger in the optical recording medium 100 than in the DVDs even if the thickness of the covering layer 4 is set to not more than 1/4.563 the thickness of the substrate, that is, 131 $\mu$m or less. For the above-mentioned reason, it is necessary to set the thickness of the covering layer 4 to 131 $\mu$m or less.

By setting Vickers hardness of the protective layer 4 to 1000 kg/mm$^2$ or more, it becomes difficult that the surface of the recording medium is injured. In the case that the Vickers hardness of the protective layer 4 is set to 2000 kg/mm$^2$ or more, the surface hardness of the protective layer 4 can be made larger than the Vickers hardness (about 2000 kg/mm$^2$) of silicon oxide, which is a main component of sand, which is considered to be in general hardest among substances which adhere undesirably to the surface of the recording medium. In this case, the surface of the recording medium is not easily injured when sand adhering to the surface of the recording medium is wiped out.

In the case that the Vickers hardness of the protective layer 4 is set to 3000 kg/mm$^2$ or more, the surface hardness of the recording medium becomes still larger than the Vickers hardness of silicon oxide. Thus, this case is ideal from the viewpoint of preventing the surface from being injured.

Figure 3:
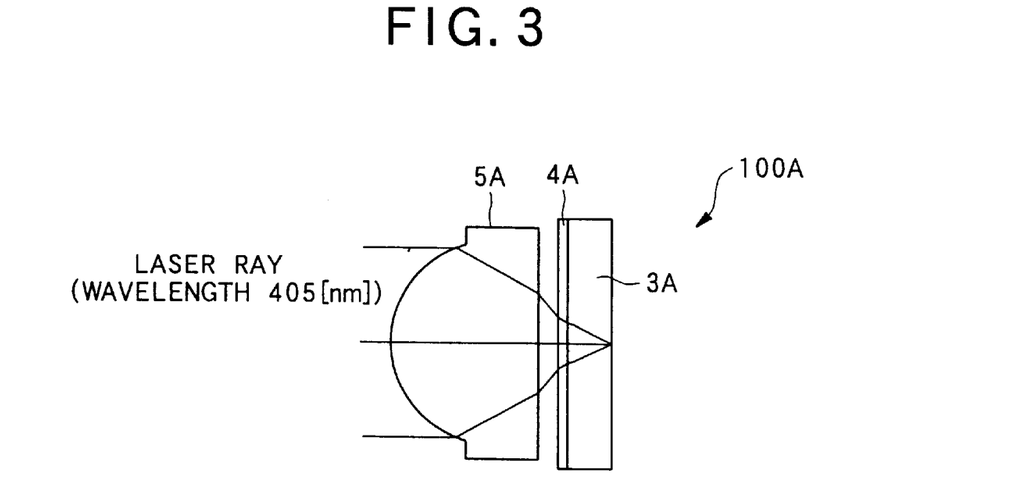
FIG. 3 is a view illustrating a state that recorded information are reproduced by a laser ray.
Figure 4:
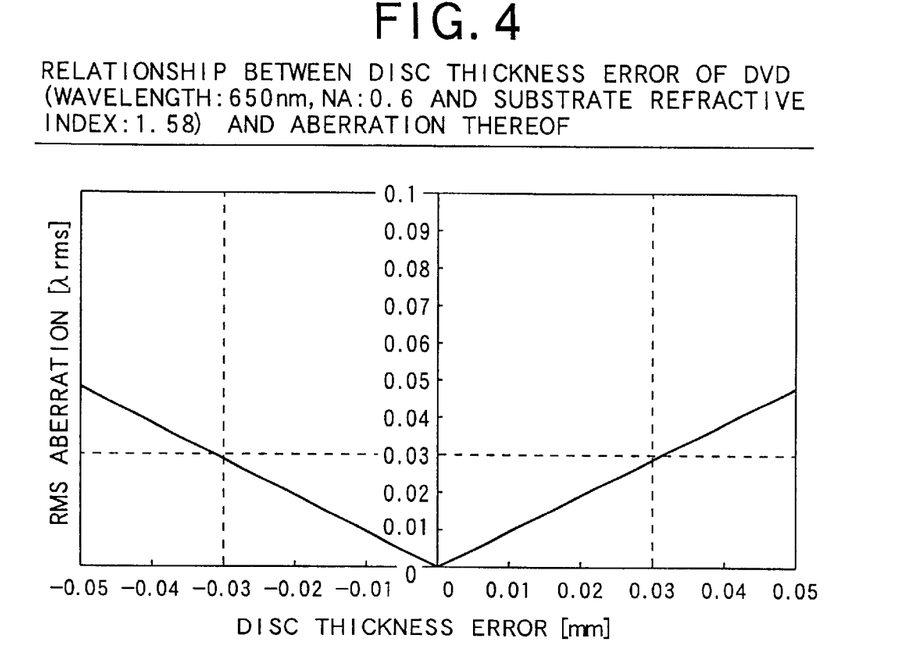
FIG. 4 is a graph showing a relationship between the disc thickness error of a DVD and the aberration thereof, the relationship being obtained by calculation.
Figure 5:
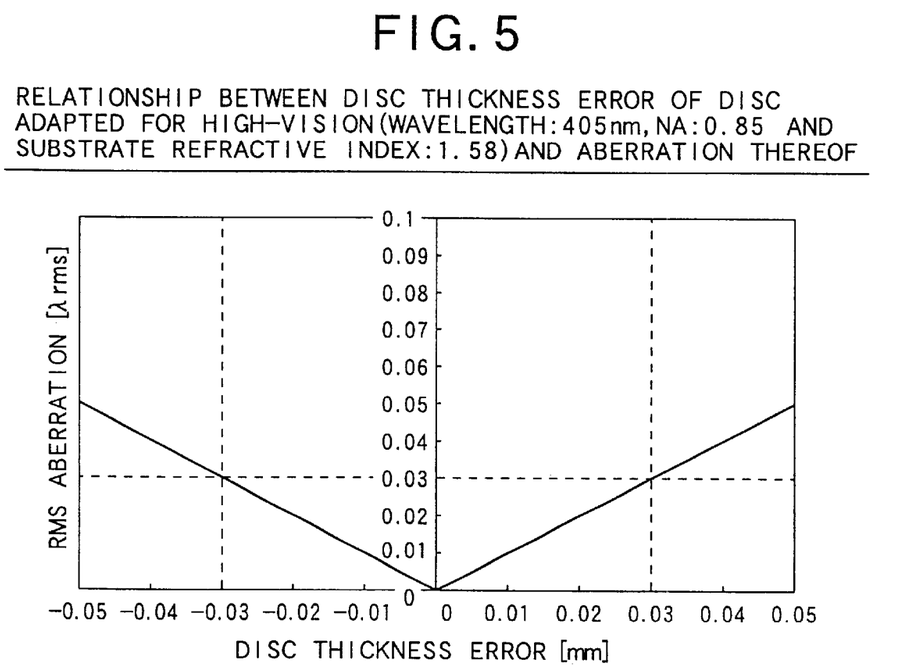
FIG. 5 is a graph showing a relationship between the disc thickness error of a disc adapted for high-vision and the aberration thereof, the relationship being obtained by calculation.
Figure 6:
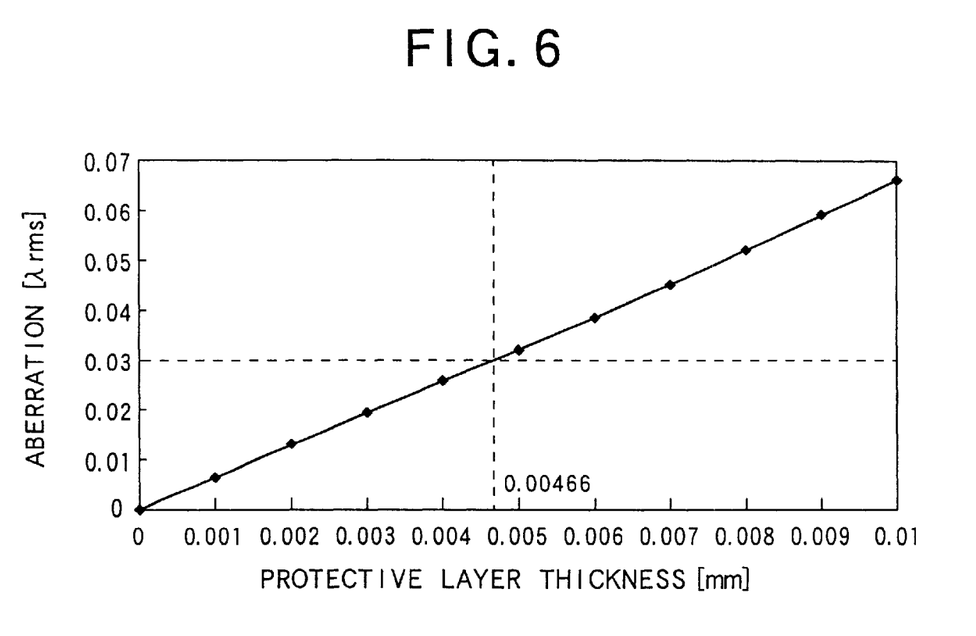
FIG. 6 is a graph showing a relationship between the thickness of a protective layer and spherical aberration, the relationship being obtained by calculation.
Figure 7:
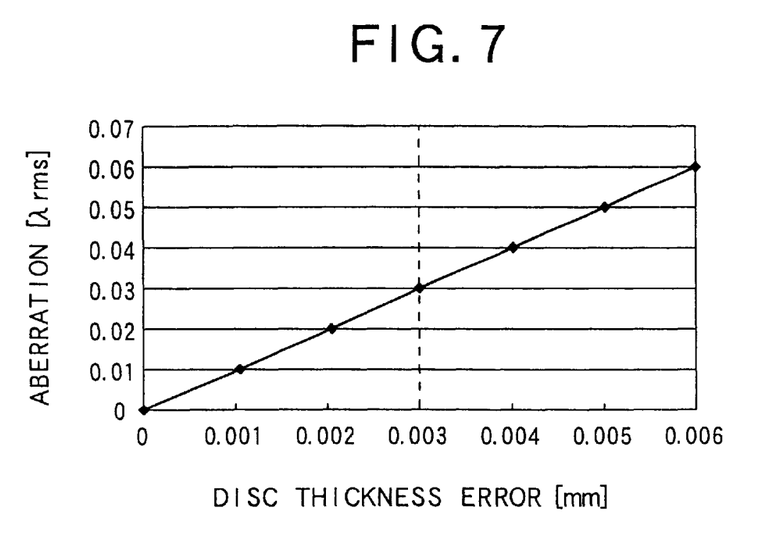
FIG. 7 is a graph showing a thickness error property of a disc.

FIG. 3 is a view illustrating a state that a laser ray having a wavelength of 405 nm is radiated onto an optical disc 100A to reproduce recorded data. FIG. 4 is a graph showing a relationship between the disk thickness error of a DVD and the aberration thereof, the relationship being obtained by calculation. In order to form a spot of a diffraction limit on a disc in an optical disc system, it is necessary to control the aberration of an optical system including a pickup and the disc into 0.07 λrms or less. This is called Marechal limit, and is generally known by optical designers. The standard of DVDs stipulates that the disc thickness error thereof is within ±0.03 mm. In the case that this is converted to an aberration, the aberration is about 0.03 λrms, as is evident from FIG. 4. In other words, it can be considered that 0.03 ërms out of 0.07 ërms, which is an aberration allowed for the whole, is assigned to the disc and the remaining aberration is assigned to the pickup optical system. FIG. 5 is a graph showing a relationship between the disc thickness error of a disc adapted for high-vision and the aberration thereof, the relationship being obtained by calculation. When the aberration assigned to the disc is defined as 0.03 λrms in the same way as in the standard of DVDS, a disc thickness error of about ±0.003 mm (39 $\mu$m) is allowable, as is clear from FIG. 5. For the optical disc 100A wherein a protective layer 4A having a high refractive index is applied onto a covering layer 3A made of a glass plate having a thickness of 0.1 mm as illustrated in FIG. 3, an objective lens 5A (numerical aperture: 0.85) designed so as to have a minimum aberration is used to calculate a relationship between the thickness of the protective layer 4A and spherical aberration when the optical disc 100A is reproduced. The results thereof are shown in FIG. 6. FIG. 7 is a graph showing the error property of the optical disc thickness. As illustrated in FIG. 7, the disc thickness error that is allowable is 3 $\mu$m. Therefore, the aberration value in this case is 0.03 λrms. From this value and FIG. 6, the allowable value of the thickness of the protective layer 4 is 4.66 $\mu$m.

By setting the thickness of the protective layer 4 particularly into 3 $\mu$m or less, it is possible to prevent the protective layer 4 from being cracked by the stress of the layer itself or being exfoliated from the covering layer 3. By making the protective layer 4 thin, the time necessary for forming the protective layer 4 is shortened so that production costs thereof is suppressed. Furthermore, deterioration of recording and reproducing signals by the protective layer 4 can be prevented since the aberration based on the protective layer 4 can be made small. The lower limit of the thickness of the protective layer 4 is decided so as to obtain substantially an effect for suppressing injuries in the surface of the recording medium.

The light transmissivity of the protective layer 4 is desirably 95% or more. When the light transmissivity is set to 95% or more, recording and reproducing signals are not substantially deteriorated by the protective layer 4 and no restriction is substantially added to the optical properties of other layers. When the thickness of the protective layer 4 is set to 3 $\mu$m or less, about almost all of the above-mentioned materials of the protective layer 4 the light transmissivity thereof is 95% or more.

DLC used as the material of the protective layer 4 has both of high hardness and some flexibility so that DLC is not easily injured and is not easily cracked or exfoliated. From this viewpoint, DLC is one of optimal materials for the protective layer of the recording medium.

In various industries, carbon materials are widely used in various forms, such as diamond, graphite, glassy carbon and C60, to which attention has been paid in recent years. This is because chemical bonds of a carbon atom have various forms and carbon exhibits different mechanical, electrical and optical properties dependently on the bonding forms thereof.

DLC can be estimated as a carbon material that is produced by a thin-film producing method in vacuum plasma and has unprecedented properties. Any carbon atom has four unpaired electrons for forming covalent bonds. The bonding form or the physical property of carbon varies dependently on the form of orbits of the four electrons. It has been considered that DLC is a substance wherein amorphous structure which does not have long-distance order includes $SP^3$ orbits of single bonds or $SP^2$ orbits of double bonds.

The thickness of the protective layer 4 is set to 4.66 $\mu$m or less, and the total thickness of the covering layer 3 and the protective layer 4 is set to 131 $\mu$m or less. This thickness is decided on the basis of the total thickness of the covering layer 3 and the protective layer 4, the refractive indexes of the respective layers, the transmissivity of the total of the covering layer 3 and the protective layer 4, and so on, which are specified in order to focus a laser ray onto the recording layer 2. This transmissivity, to a laser ray having a wavelength of 405 nm, is desirably set to 90% or more. As the hardness of the protective layer 4, a Vickers hardness of 1000 kg/mm$^2$ or more is desired. In this case, the protective layer 4 is not easily injured even when dirt or a fingerprint is wiped out.

The following will describe a method for reading out data recorded in the recording medium 100. As illustrated in FIG. 1, a laser ray 6 radiated through an optical system 5 is used to read out the data recorded in the recording medium from the side of the protective layer 4. The numerical aperture (NA) of the optical system 5, through which the laser ray 6 radiated toward the recording medium 100 passes, is 0.74 or more, for example, 0.85. A focus 7 of the laser ray 6 is set onto the recording layer 2. By receiving a reflected ray from the recording layer 2 while rotating the recording medium 100 relatively to the optical system, the data recorded on the basis of unevenness of the recording layer 2 can be successively read out.

Figure 8:
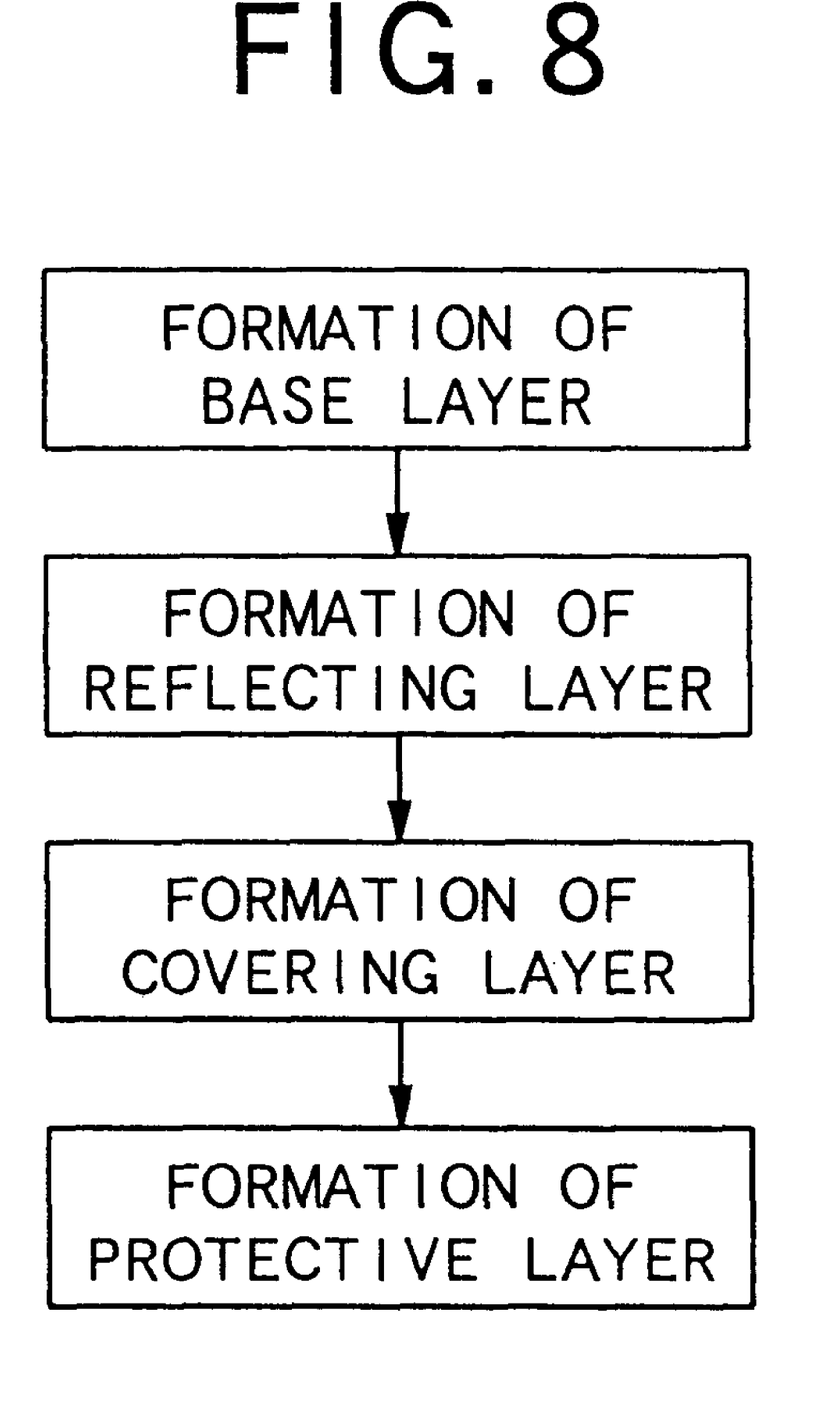
FIG. 8 is a flowchart of a method for producing an optical recording medium.

Referring to FIG. 8, the following will describe a method for producing the recording medium 100.

By using a stamper as a mold, the base layer 1 can be formed into a shape having given unevenness. Next, a reflecting film 2 is formed on the upper surface of the base layer 1 (see FIG. 1) by sputtering, vapor deposition or the like. Next, the covering layer 3 can be formed, for example, by supplying an ultraviolet ray curing resin onto the reflecting film 2 and subsequently radiating ultraviolet rays thereto. In the case that the covering layer 3 is formed, either of the following maybe used: the so-called 2P spin coating method,wherein a liquid ultraviolet ray curing resin is applied by spin coating and subsequently ultraviolet rays are radiated thereto; or a method wherein an ultraviolet ray curing resin fashioned into a sheet form is adhered onto the surface of the reflecting film 2 and subsequently ultraviolet rays are radiated thereto. Since a part including the base layer 1, the recording layer 2 and the covering layer 3 can be produced by the same method for producing a DVD, detailed explanation thereof is omitted.

Next, the protective layer 4 is formed on the surface of the covering layer 3. As the method for forming a DLC layer as the protective layer 4, there are known the PVD (physical vapor deposition) method, wherein solid carbon is used as a main material, and the CVD (chemical vapor deposition) method, wherein hydrocarbon gas is used as a main material. Examples of the PVD method include sputtering, the vacuum arc method, and the laser evaporation method in vacuum. Examples of the CVD method include the plasma CVD, the electron resonance CVD, and the ion gun CVD.

The DLC layer of the optical recording medium of the present invention can be formed by any one of the above-mentioned methods. However, through the PVD method, the DLC can be formed under the condition that substrate temperature is 100° C. or less, while through the CVD method, substrate temperature needs to be set to 200° C. or more. Accordingly, in the case that a glass substrate is used as the base layer 1, no problems arise even if any one of the above-mentioned methods is used. However, in the case that a resin substrate, such as polycarbonate or PMMA, which is poor in heat-resistance, is used, the PVD method is more suitable.

The following will describe one example of conditions for forming the DLC film on a resin substrate having a diameter of 12 cm by sputtering.

Sputtering Conditions

Target: carbon, diameter=6 inches,

Cathode: ferromagnetic magnetron, leakage density=50 to 500 Oe,

Substrate bias: −50 to −2000 V,

Sputtering gas: Ar, Ar+H, Ar+$CH_4$, or Ar+$N_2$,

Sputtering gas flow rate: 5 to 200 SCCM.

Sputtering pressure: 0.5 to 20 mTorr,

Sputtering electric power: 0.1 to 5 kW DC or RF,

Target-substrate distance: 20 to 200 mm.

According to the above-mentioned conditions, the sputtering rate of the DLC layer is from 0.1 to 5 $\mu$m per minute. Therefore, for example, in order to obtain a film thickness of 100 $\mu$m, it is necessary to perform sputtering for 20 to 100 minutes.

The Vickers hardness of the DLC layer obtained under the above-mentioned conditions is from 1000 to 10000 kg/$mm^2$, and the optical transmissivity thereof to light having a wavelength of 405 nm is 90% or more when the film thickness of the layer is 100 $\mu$m.

Figure 2:
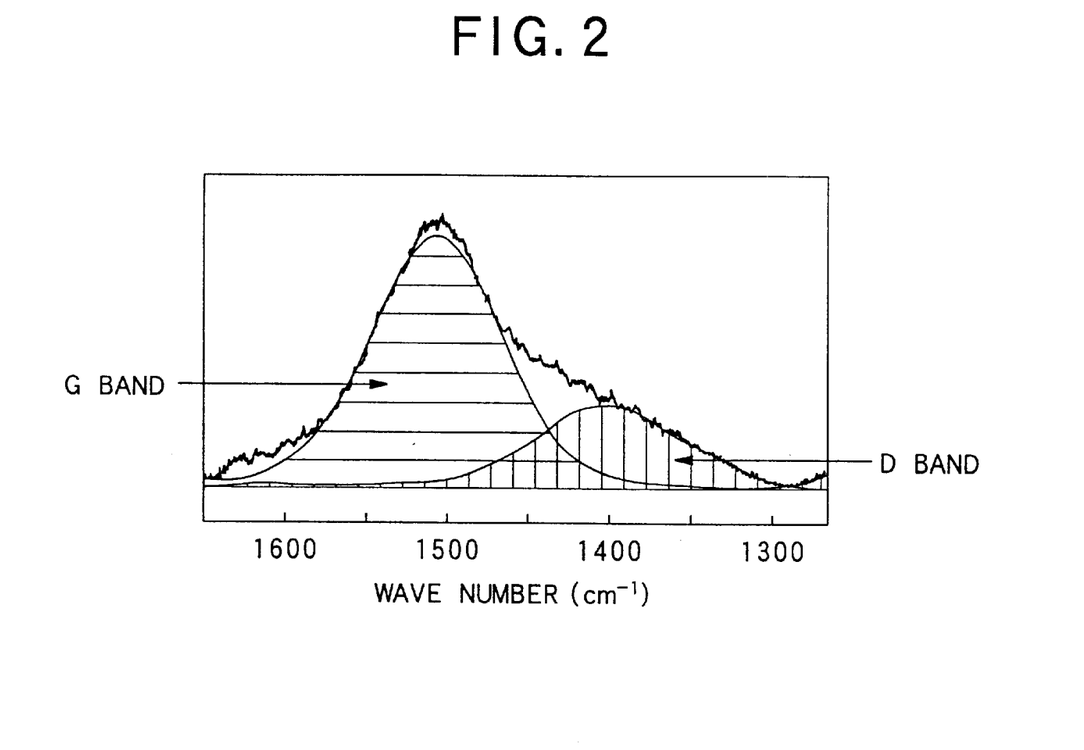
FIG. 2 is a view showing a Raman spectrum obtained by subjecting a diamond-like carbon layer to Raman analysis.

FIG. 2 shows a Raman spectrum obtained when the DLC layer formed under the above-mentioned conditions was subjected to Raman analysis. As illustrated in FIG. 2, broad Raman bands are observed, the centers of which are near 1550 cm−1 (graphite (G) band) and 1400 cm−1 (diamond (D) band). This Raman spectrum suggests that a film wherein a SP2 orbit and a SP3 coexisted was obtained.

In the above-mentioned embodiment, the DLC layer is formed as the protective layer, but the protective layer may be made of a material other than DLC. As the material of the protective layer, the following may be used: a metal oxide, a metal nitride, a metal complex oxide, a metal sulfide, a metal fluoride, a metal chloride, a metal bromide, a metal iodide, a metal oxynitride, or a metal carbonitride.

Examples of the metal oxide or the metal nitride include $SiO_x$, $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $TN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PbO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $TiO_x$, $TiN_x$, $SiN_x$, $GeO_x$, $SnO_x$, $PbO_x$, $PO_x$, $PN_x$, $AsO_x$, $SbO_x$, $SeO_x$, $TeO_x$.

Examples of the metal complex oxide include $LiAlO_2$, $LiSi_2O_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3A_{15}O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_2Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_4$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2 \cdot Sb_2O_3$, $CuSeO_4$, $Na_2SeO_3$, $ZnSeO_3$, $K_2TeO_3$, $K_2TeO_4$, $Na_2TeO_3$, $Na_2TeO_4$.

Examples of the metal sulfide include FeS, $Al_2S_3$. MgS, and ZnS.

Examples of the metal fluoride include LiF, $MgF_2$, and $SmF_3$.

Examples of the metal chloride include HgCl, $FeCl_2$ and $CrCl_3$.

Examples of the metal bromide include AgBr, CuBr, and $MnBr_2$.

Examples of the metal iodide include $PbI_2$, Cu , $FeI_2$.

Examples of the metal oxynitride include SiAlON.

Examples of the metal carbonitride include FeC, AlC, CaC, CB, ZrC, $Cr_3C_2$, SiC, WC, TiC, BN and CBN.

In the above-mentioned embodiment, the present invention is applied to a monolayer disc, but may be applied to a multilayer disc.

The optical recording medium of the present invention is an optical recording medium comprising a recording layer, a covering layer comprising a polymer material, and a protective layer which are successively deposited, recording or reproducing wavelength for the medium being 420 nm or less, the numerical aperture of an optical system for the medium being 0.74 or more, and light being radiated to the side of the protective layer to read out data in the recording layer, wherein the protective layer has a hardness of 1000 kg/$mm^2$ or more and a thickness of 4.6611 $\mu$m or less. This recording medium is suitable for high-density recording, and its surface is not easily injured. This recording medium can be made up to a practical recording medium which has a recording density not less than 3.64 times larger than that of DVDs and is not required to be put into a cartridge.

The entire disclosure of Japanese Patent Application No. 2000-329256 filed on Oct. 27, 2000 including the specification, claims, drawings and summary is incorporated herein by reference in its entirety.

What is claimed is:

1. An optical recording medium comprising a recording layer, a covering layer comprising a polymer material, and a protective layer which are successively deposited, recording or reproducing wavelength for the medium being 420 nm or less, the numerical aperture of an optical system for the medium being 0.74 or more, and light being radiated to the side of the protective layer to read out data in the recording layer, wherein the protective layer has a hardness of 1000 kg/$mm^2$ or more and a thickness of 4.66 $\mu$m or less.

2. The optical recording medium according to claim 1, wherein the covering layer has a thickness of 131 $\mu$m or less.

3. The optical recording medium according to claim 1, wherein the protective layer has a light transmissivity of 90% or more to the recording or reproducing wavelength.

4. The optical recording medium according to claim 1, wherein the protective layer comprises an inorganic substance.

5. The optical recording medium according to claim 4, wherein the protective layer comprises a metal oxide.

6. The optical recording medium according to claim 5, wherein the protective layer comprises $SiO_2$.

7. The optical recording medium according to claim 5, wherein the protective layer comprises $TiO_2$.

8. The optical recording medium according to claim 4, wherein the protective layer comprises a metal nitride.

9. The optical recording medium according to claim 1, which is a read-only recording medium.

10. An optical recording medium comprising a recording layer, a covering layer comprising a polymer material, and a protective layer which are successively deposited, recording or reproducing wavelength for the medium being 420 nm or less, the numerical aperture of an optical system for the medium being 0.74 or more, and light being radiated to the side of the protective layer to read out data in the recording layer, wherein the protective layer has a hardness of 1000 kg/mm² or more and a thickness of 4.66 μm or less, wherein the protective layer comprises diamond-like carbon.

11. A method for producing an optical recording medium comprising a recording layer, a covering layer comprising a polymer material, and a protective layer comprising diamond-like carbon which are successively deposited, data in the recording layer being read out from the side of the protective layer, comprising:

the process of forming the covering layer on a surface of the recording layer, and the process of forming the protective layer on the surface of the formed covering layer by or deposition.

12. The method for producing the optical recording medium according to claim 11, wherein sputtering is used in the process of forming the protective layer.

13. The method for producing the optical recording medium according to claim 12, wherein carbon is used as a target and a gas comprising argon is used as a sputtering gas in the process of forming the protective layer.

14. The method for producing the optical recording medium according to claim 13, wherein a gas obtained by mixing argon with at least one selected from hydrogen gas, methane gas and nitrogen gas is used as the sputtering gas.

* * * * *